United States Patent [19]
Trauten

[11] Patent Number: 5,826,699
[45] Date of Patent: Oct. 27, 1998

[54] GOODS STORAGE AND CONVEYOR SYSTEM

[76] Inventor: Carlos Trauten, Nerotal 2, Wörrstadt, Germany, 55286

[21] Appl. No.: 596,192

[22] PCT Filed: Aug. 11, 1994

[86] PCT No.: PCT/DE94/00924

§ 371 Date: Apr. 15, 1996

§ 102(e) Date: Apr. 15, 1996

[87] PCT Pub. No.: WO95/05330

PCT Pub. Date: Feb. 23, 1995

[51] Int. Cl.⁶ .................................................. B65G 047/54
[52] U.S. Cl. ........................ 198/463.3; 414/269; 198/809; 198/959; 198/370.1; 198/782
[58] Field of Search ................................ 198/463.3, 809, 198/370.1, 371.2, 782, 959; 414/273, 268, 269, 270, 271, 272, 267, 21, 531; 364/478

[56] References Cited

U.S. PATENT DOCUMENTS

| | | | |
|---|---|---|---|
| 1,929,204 | 10/1933 | Jeffrey et al. | 198/809 X |
| 2,156,248 | 4/1939 | Wegner | 198/463.3 |
| 2,681,130 | 6/1954 | Atwood | 198/463.3 |
| 3,134,476 | 5/1964 | Pierson et al. | 198/463.3 |
| 3,321,063 | 5/1967 | Blume | 198/370.1 X |
| 3,883,008 | 5/1975 | Castaldi | 414/269 X |
| 4,915,566 | 4/1990 | van Elten | 414/268 X |
| 4,962,841 | 10/1990 | Kloosterhouse | 198/809 X |
| 5,044,819 | 9/1991 | Kilheffer et al. | 198/959 X |
| 5,205,394 | 4/1993 | Zeuscher | 198/463.3 X |
| 5,238,349 | 8/1993 | Grace, Sr. | 198/809 X |

FOREIGN PATENT DOCUMENTS 487820 6/1976 U.S.S.R. .................................. 198/782

*Primary Examiner*—Frank E. Werner
*Attorney, Agent, or Firm*—Diller, Ramik & Wight, PC

[57] ABSTRACT

In order to be able to continuously operate a storage and conveyor system, consisting of two main conveyor tracks running parallel to each other and containing storage locations for goods in a minimum of space, in such a way as to allow retrieval of specific goods at the ends of the main conveyor tracks, it is proposed that the ends of the main conveyor tracks be connected by two cross-conveyor tracks, arranged at right angles to the conveying direction, consisting of two track sections, located one behind the other and capable of being separately raised and lowered in vertical direction, these cross-conveyor tracks being movable in the conveying direction of the main conveyor tracks.

13 Claims, 10 Drawing Sheets

5,826,699

GOODS STORAGE AND CONVEYOR SYSTEM

BACKGROUND OF THE INVENTION

The invention relates to a storage and conveyor system for goods, consisting of two horizontal main conveyor tracks, running parallel to each other and conveying in opposite directions, the ends of which lie roughly flush with each other, and a horizontal cross-conveyor track, arranged with its conveying direction at right angles to the conveying direction of the main conveyor tracks and located at one end of the main conveyor tracks, the cross-conveyor track consisting of at least two track sections, located one behind the other in the conveying direction of the cross-conveyor track, whose conveying planes can be separately raised and lowered vertically for continuous transport of the goods from one main conveyor track to the other.

Storage and conveyor systems of this kind are known from DE-A-1781097 and FR-A-7708247, for example.

In the known conveyor devices, however, continuous transfer of the goods from the main conveyor tracks to the cross-conveyor tracks and vice versa is not possible, because the angular position of the goods being transported would change. The known installations thus of necessity have to be operated step-by-step and thus at a comparatively slow transport speed.

On the other hand, there is often a need in warehousing operations and/or in-house transport systems to retrieve specific items of stored goods from a store and convey them to a specific workplace or transport station as quickly as possible.

To this end, so-called high-bay warehouses have been built, in which aisles for retrieval vehicles have to be left free between the individual storage racks, the result being that storage takes up a relatively large amount of space.

SUMMARY OF THE INVENTION

The invention is based on the task of creating a goods storage and conveyor system which permits optimum utilisation of available space within the warehouse and allows a specific item of goods to be transported to a retrieval point in a short time.

In accordance with the invention, this task is solved by the fact that the cross-conveyor track can be moved in the conveying direction of the main conveyor tracks, with a cross-conveyor track being provided at both the front and rear end of the main conveyor tracks and running in opposite directions.

The goods storage and conveying system in accordance with the invention essentially consists of two horizontal main conveyor tracks, running parallel to one another and providing numerous storage positions for the goods, such as containers. Retrieval or storage of goods takes place at the front or rear end of the main conveyor tracks in each case. If, for example, a container to be retrieved is located immediately in front of the horizontal cross-conveyor tracks, it can be transferred to these and retrieved there. However, if the container required is located in the interior area of a main conveyor track, it must first be transported to the retrieval end of the respective main conveyor track, in order to be retrieved from the storage system. This is achieved by the containers or stored goods located in front of it being moved in the conveying direction and transferred individually to the corresponding cross-conveyor tracks. Having arrived on the cross-conveyor tracks, the containers are transported at right angles to the conveying direction of the main conveyor tracks, in a manner to be described in detail later, and transferred to the adjacent main conveyor track, running in the opposite direction. This procedure takes place at the ends of the two main conveyor tracks in the form of a cyclic exchange. Consequently, the goods switch places from one main conveyor track to the other as often as necessary until the required container is transferred to the cross-conveyor track, from where it can be retrieved by retrieval devices.

If stationary cross-conveyor tracks were used, switching from one main conveyor track to the other would only be possible by operating the storage and conveying system on a step-by-step basis. Continuous, and thus faster, operation can be achieved in accordance with the invention because the cross-conveyor tracks can be moved along the main conveyor tracks and consist of at least two track sections, located one behind the other, whose conveying planes can be separately raised and lowered in a vertical direction.

The details of the transfer from one main conveyor track to the other with the aid of the cross-conveyor tracks are described below:

The cross-conveying tracks, consisting of two track sections located one behind the other, are located directly at the ends of the two main conveyor tracks, the track section of a cross-conveyor track onto which the storage container is to be transferred from the main conveyor track being lowered below the conveying plane of the corresponding main conveyor track. As soon as the storage container is positioned above the lowered track section, the latter is raised above the conveying plane of the main conveyor track, the entire cross-conveyor track subsequently moving away from the ends of the main conveyor tracks. In this context, the speed of movement of the cross-conveyor tracks is expediently higher than the conveying speed of the track from which the container was transferred. At the same time as the cross-conveyor track moves in the conveying direction, the stored goods are transported crosswise towards the adjacent main conveyor track, running in the opposite direction, the container being transferred to the second track section, whose conveying plane is, in contrast to its adjacent track section, still lower than the conveying plane of the main conveyor tracks. As soon as the container has moved far enough at right angles to the conveying direction of the main conveyor tracks to be able to be picked up by the second track section of the cross-conveyor track, the latter is raised, the cross-conveyor track simultaneously moving back again from its most remote position in relation to the end of the main conveyor track. While the cross-conveyor track is moving back to its position below the ends of the main conveyor tracks, the container located on the second track section, which is raised above the conveying plane of the main conveyor tracks, is simultaneously conveyed at right angles to the main conveyor tracks to a transfer position at which it can be transferred to the second main conveyor track. By lowering the second track section or its conveying plane below the conveying plane of the second main conveyor track, the latter takes over the container while, at the same time, the first track section of the cross-conveyor track is in its lowered position, meaning that the next container can be taken over from the first main conveyor track. As a result, a new transfer cycle can now begin.

During the transfer of a container from one main conveyor track to the adjacent one, with simultaneous movement of the cross-conveyor tracks, as explained above, the container thus describes a circular path without altering its angular position in relation to the main conveyor tracks. This permits problem-free, continuous transfer of the containers from one main conveyor track to the adjacent one.

Owing to the continuous mode of operation, a specific requested container, or a random item of stored goods, can be conveyed to the retrieval point in the fastest possible way, without having to leave an aisle for a retrieval device free between the main conveyor tracks, which act as the store.

The problem-free transfer of the stored goods from the main conveyor tracks to the cross-conveyor tracks is enabled by the two track sections of the cross-conveyor tracks, whose conveying plane can be separately raised and lowered above and below the conveying plane of the main conveyor tracks. This means that the track sections of the cross-conveyor tracks can reach below the ends of the main conveyor tracks and, once the corresponding track section has been raised above the conveying plane of the transferring main conveyor track, take over the container without difficulty.

The individual conveyor tracks can be designed as endlessly circulating belt conveyors, although it is also possible to form the conveying planes of the tracks from a large number of rollers which can be driven individually or separately and which convey the goods on the moving upper section of their circumference.

Storage and conveyor systems in accordance with the invention can be arranged horizontally and/or vertically in any desired layout and numbers, meaning that storage capacities of any desired size can be constructed which require only a minimum of space.

Naturally, the transfer principle in accordance with the invention can also be applied in a conveyor system in which one main conveyor track serves as a storage and conveyor track and the goods are continuously transferred to a cross-conveyor track whose conveying direction is arranged at right angles to this conveyor track. In this case, the cross-conveyor track is located at one end of the main conveyor track and features a track section, whose conveying plane can be raised and lowered vertically, the cross-conveyor track, in turn, again being movable in the conveying direction of the main conveyor track.

In this system according to the invention, there is, of course, no need for the cross-conveyor track to consists of two separate track sections, as continuous transfer to a second main conveyor track is not necessary.

As previously mentioned, it is expedient to select a travelling speed of the cross-conveyor tracks which is higher than the conveying speed of the main conveyor tracks. This results in the goods being removed from the area of the transferring main conveyor track very rapidly and conveyed further at right angles to the main conveyor tracks, without having to reduce the conveying speed of the circulating main conveyor tracks.

Expedient retrieval devices, which can be designed as separate lifting devices, straddle loaders or similar, for example, can be provided for retrieval of the goods transported to the discharge zone. Naturally, the same also applies to the storage of new goods in the storage system.

In order to control the overall conveyor system, it is expedient to detect, identify or weigh the individual goods stored. This can be achieved by means of corresponding sensors which can, for example, be mounted at certain storage locations in the region of the main conveyor tracks. In this way, by connecting the sensors to a computer, automatic control and warehouse management can be achieved and a desired item of goods can be made ready for retrieval at the push of a button.

The possibility of weighing the individual items of goods—which, in the form of bins or containers, for example, may contain other goods—at certain points within the storage system itself also permits partial retrieval from individual bins, where connection of the weighing device to the computer permits constant updating of the inventory.

Owing to the technical circumstances, the storage and conveyor system in accordance with the invention is ideally suited to so-called chaotic storage. This storage method involves the individual goods to be stored being transported at random to the nearest free storage location and stored there, without specific product groups having to be located next to one another. Naturally, this can also be achieved by suitable computer programs, if necessary.

An example of the invention is illustrated in the drawings and described in detail below on the basis of the drawings.

DESCRIPTION OF THE PREFERRED EMBODIMENT

Figure 1:
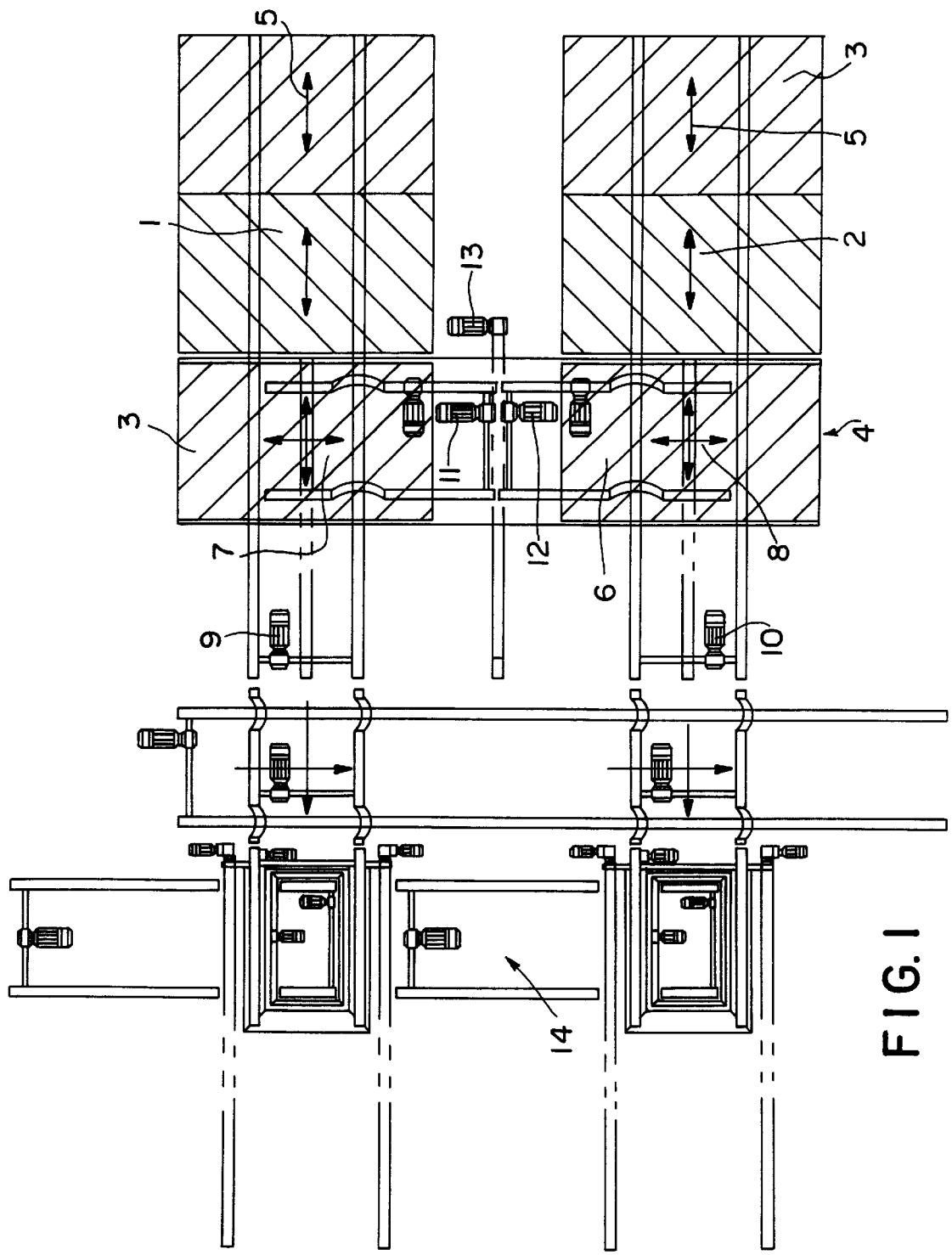
FIG. 1 A top plan view of a storage and conveyor system, where the cross-conveyor track is in transfer position, FIG. 2 A side view as per FIG. 1, FIG. 3 A top plan view of the storage and conveyor system, where the cross-conveyor track is moving away from the main conveyor tracks, FIG. 4 A side view as per FIG. 3, FIG. 5 A top plan view of the storage and conveyor system, where the cross-conveyor track is at its most remote position in relation to the main conveyor tracks, FIG. 6 A side view as per FIG. 5, FIG. 7 A top plan view of the storage and conveyor system, where the cross-conveyor track is approaching the main conveyor tracks, FIG. 8 A side view as per FIG. 7, FIG. 9 A side view as per the situation in FIG. 4, with a modified cross-conveyor track, and FIG. 10 A top plan view of a storage and conveyor system with modified drive.

The storage and conveyor system illustrated schematically in FIG. 1 in the form of a top plan view essentially consists of two main conveyor tracks 1, 2, designed as belt conveyors, with a large number of storage locations for cubic containers 3. Cross-conveyor track 6, which can be moved in conveying direction 5, is located at front end 4, at right angles to conveying direction 5. Conveying direction 5 of main conveyor tracks 1, 2 is indicated by corresponding arrows 5. When used as a conveyor system, main conveyor tracks 1, 2 move in opposite directions, where the respective direction of travel can, in principle, be selected at will.

In the situation illustrated in FIG. 1, cross-conveyor track 6 moves below the conveying plane of main conveyor tracks 1, 2 and is used for crosswise transport of containers 3 from main conveyor track 1 to main conveyor track 2.

Cross-conveyor track 6 consists of two track sections 7, 8, located one behind the other, whose respective conveying planes can be separately raised and lowered vertically above and below the conveying plane of main conveyor tracks 1, 2. Cross-conveyor track 6 is likewise designed as a belt conveyor with endlessly circulating belts.

Motors 9, 10 serve to drive the conveyor belts of main conveyor tracks 1, 2. Additional motors 11, 12 are used to drive the conveyor belts of the respective track sections 7, 8. Further motors permit separate raising and lowering of track sections 7, 8, while motor 13 is responsible for moving cross-conveyor track 6 in conveying direction 5.

Storage and retrieval devices 14, with which containers 3 can be retrieved from/stored in the storage and conveyor system are located in front of front end 4 of main conveyor tracks 1, 2, and/or in front of cross-conveyor track 6. Retrieval and storage devices 14 are designed as movable lifting devices.

Figure 2:
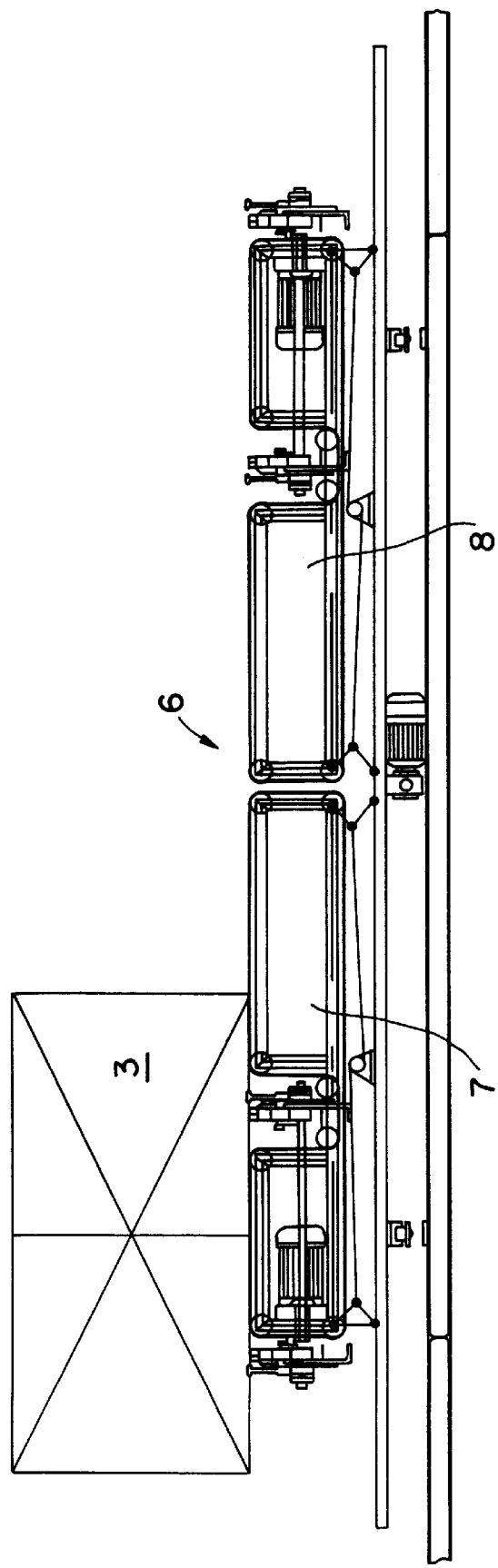

The side view in FIG. 2 serves to illustrate the position of cross-conveyor track 6 and track sections 7, 8. Cross-conveyor track 6 is located in front of front end 4 of main conveyor tracks 1, 2, where both track sections 7, 8, which consist of separate endless belt conveyors, are raised above the conveying plane of main conveyor tracks 1, 2. In this position, track section 7 takes over container 3, while a further container 3 has been transferred from track section 8 to main conveyor track 2.

Figure 3:
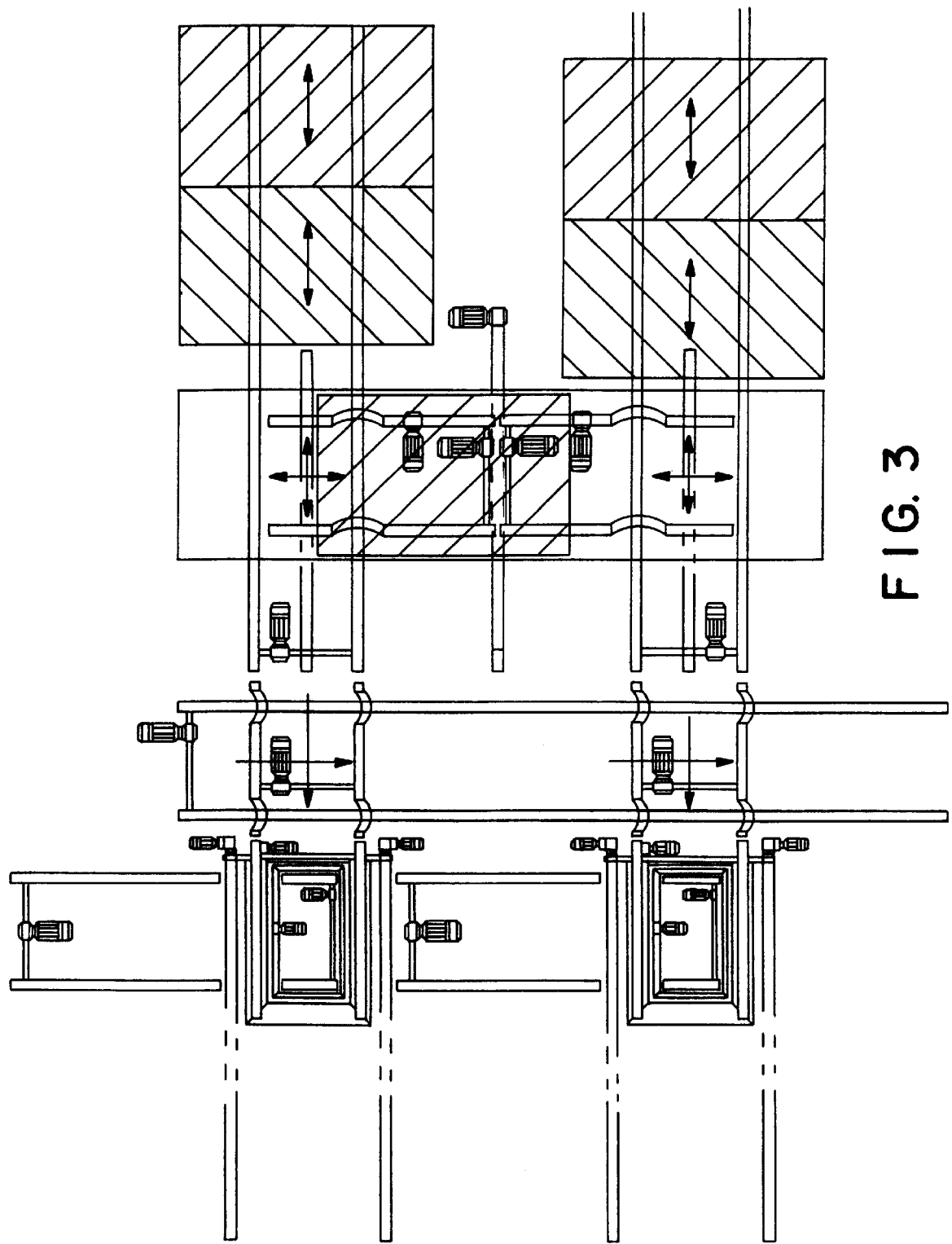

In the situation illustrated in FIG. 3, cross-conveyor track 6 is travelling to the left in conveying direction 5 of main conveyor track 1. Container 3 is pulled off main conveyor track 1 as a result. As container 3 is transported towards main conveyor track 2 by the circulating conveyor belts of cross-conveyor track 6 at the same time, container 3 moves towards the bottom of the illustration. Owing to the simultaneous movement in conveying direction 5 and at right angles thereto, container 3 thus describes a semicircular path, without changing its angular position in relation to conveying direction 5.

Figure 4:
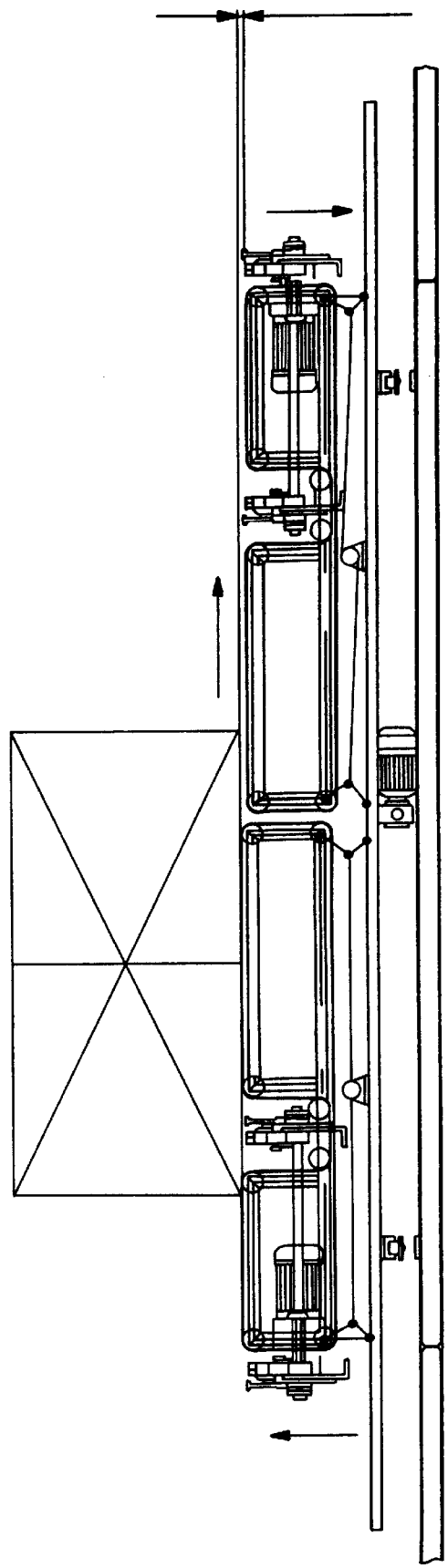

The vertical position of track sections 7, 8 in the situation illustrated in FIG. 3 can be seen in FIG. 4. Track section 7 is still above the conveying plane of main conveyor tracks 1, 2, while right-hand track section 8 is lowered below the conveying plane.

Figure 5:
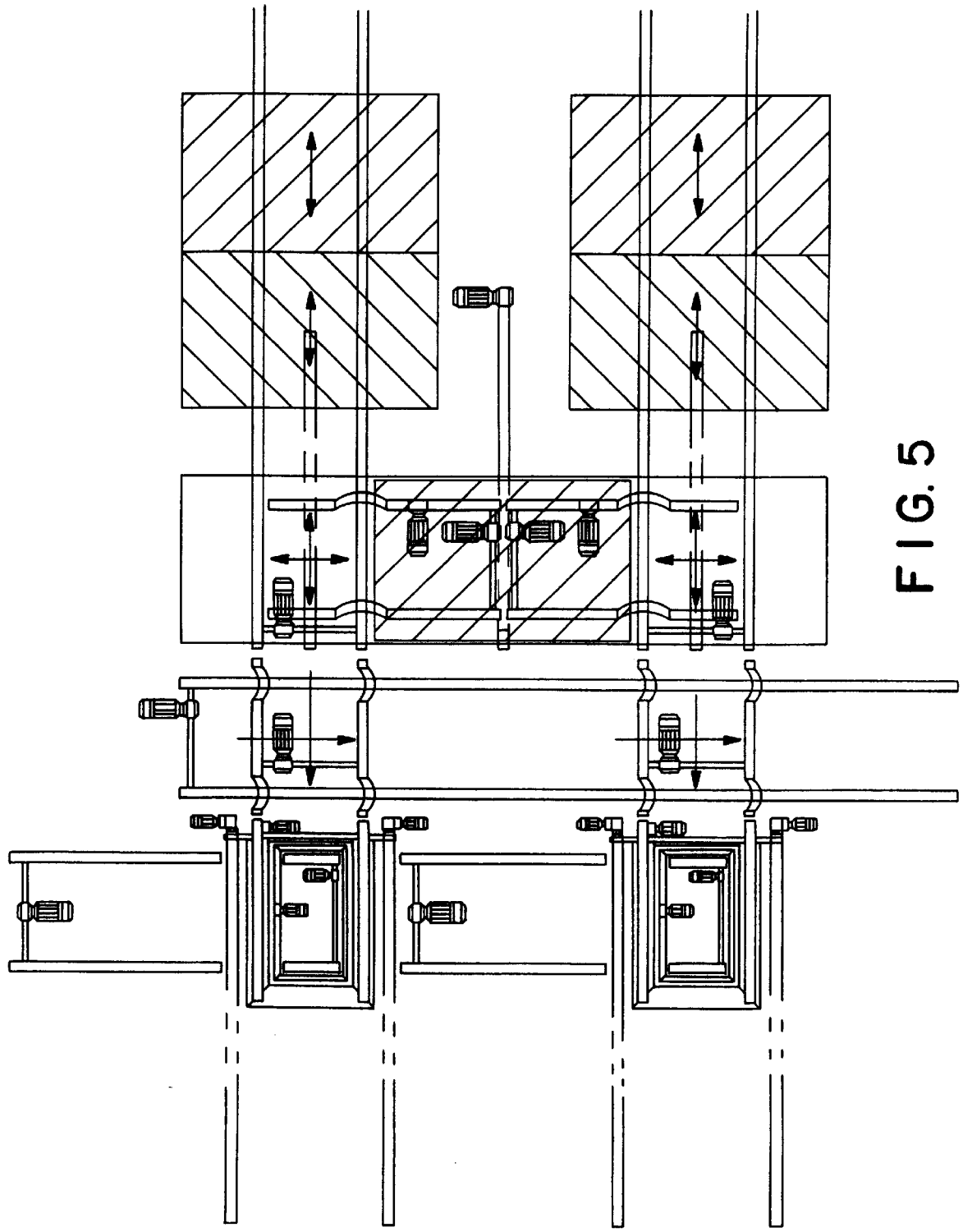

FIG. 5 illustrates a situation where container 3 is located in the middle between track sections 7, 8. At the same time, cross-conveyor track 6 has advanced to its most remote position in relation to front end 4. Container 3 has described a quarter circle in this position.

Figure 6:
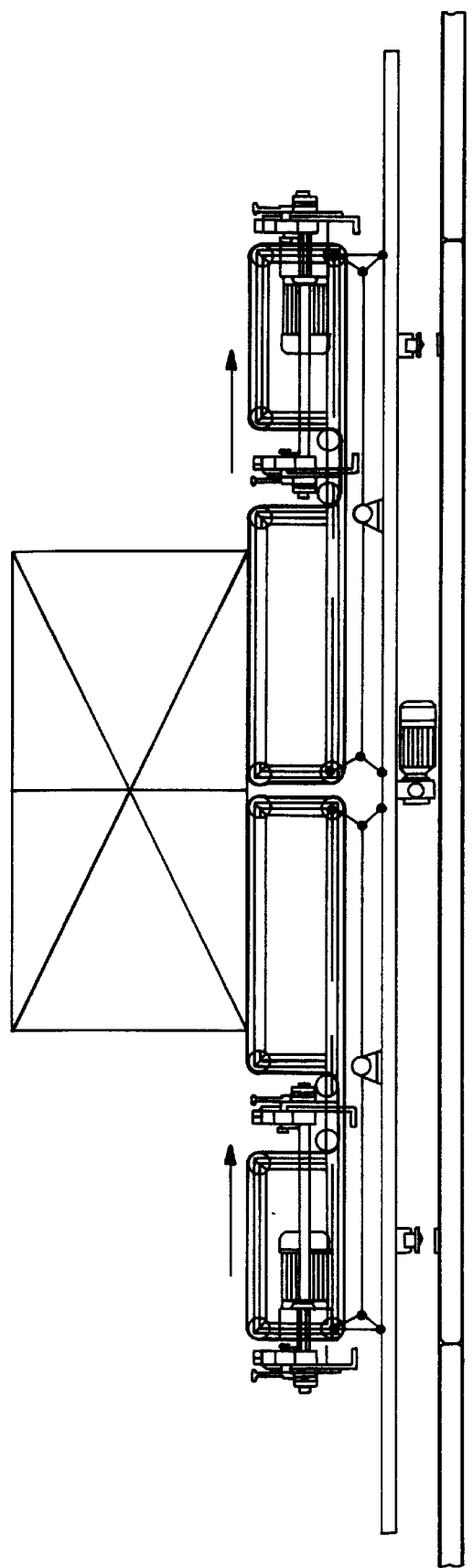

In the middle position, right-hand track section 8 is now also raised above the conveying plane of main conveyor tracks 1, 2 for further transport of container 3 (cf. FIG. 6).

Figure 7:
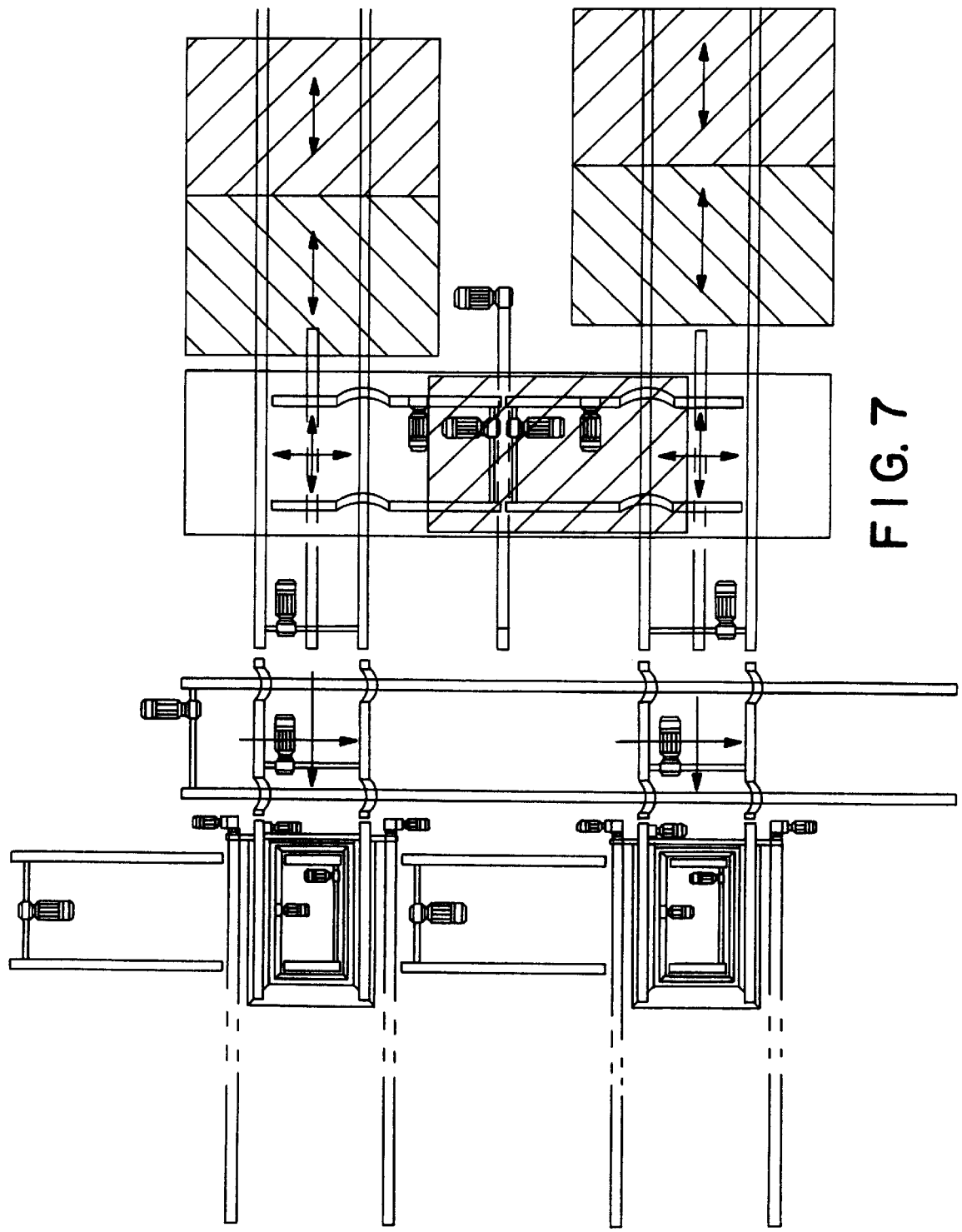
Figure 8:
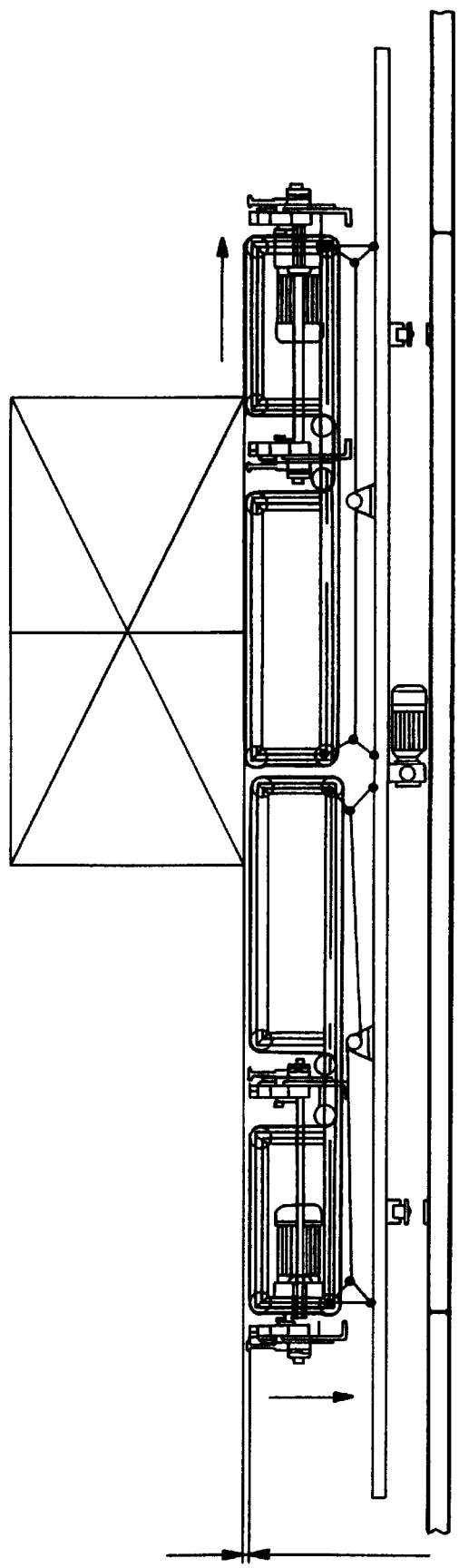

FIG. 7 shows that container 3 has already been taken up by right-hand track section 8, which conveys it to a position from which it can be transferred to main conveyor track 2. At this time, cross-conveyor track 6 travels back towards a position below front end 4 of main conveyor tracks 1, 2. In order to transfer container 3 to main conveyor track 2, track section 8 is raised, while track section 7 has been lowered in order to be able to take over the next container 3 from main conveyor track 1. As soon as a new container 3 can be transferred to track section 7, the latter is again raised above the conveying plane of main conveyor tracks 1, 2 and a new conveying cycle begins.

FIGS. 1 to 8 only show the left-hand part of the storage and conveyor system in each case. Main conveyor tracks 1, 2 can, in principle, be of any desired length and can feature a correspondingly large number of storage locations for the containers. The right-hand end of main conveyor tracks 1, 2, which is not shown in the drawings, is equipped with corresponding cross-conveyor tracks and/or corresponding retrieval and storage devices, so that the system can operate continuously on the basis of a cyclic exchange and goods can be retrieved and stored at both ends.

Figure 9:
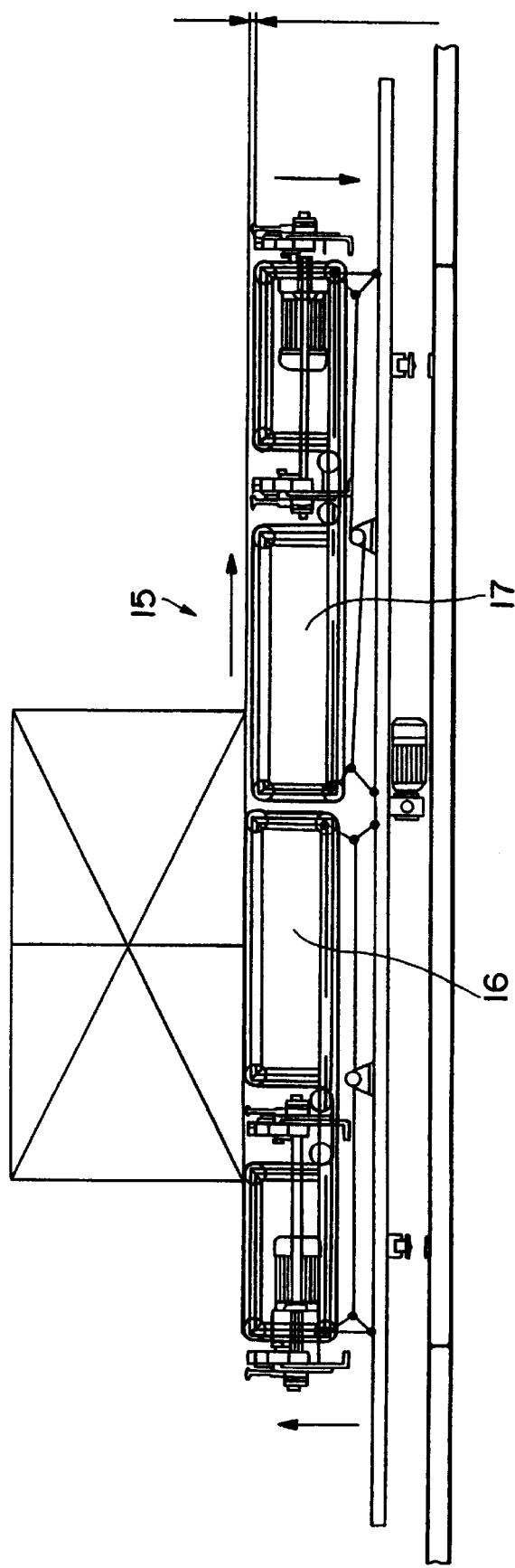

FIG. 9 illustrates a situation in which container 3 is located in a position as per FIG. 4. In contrast to separate track sections 7, 8 in FIGS. 1 to 8, cross-conveyor track 15 is in this case designed as a continuous belt conveyor with two track sections 16, 17, or conveying planes, which can be raised and lowered separately.

Figure 10:
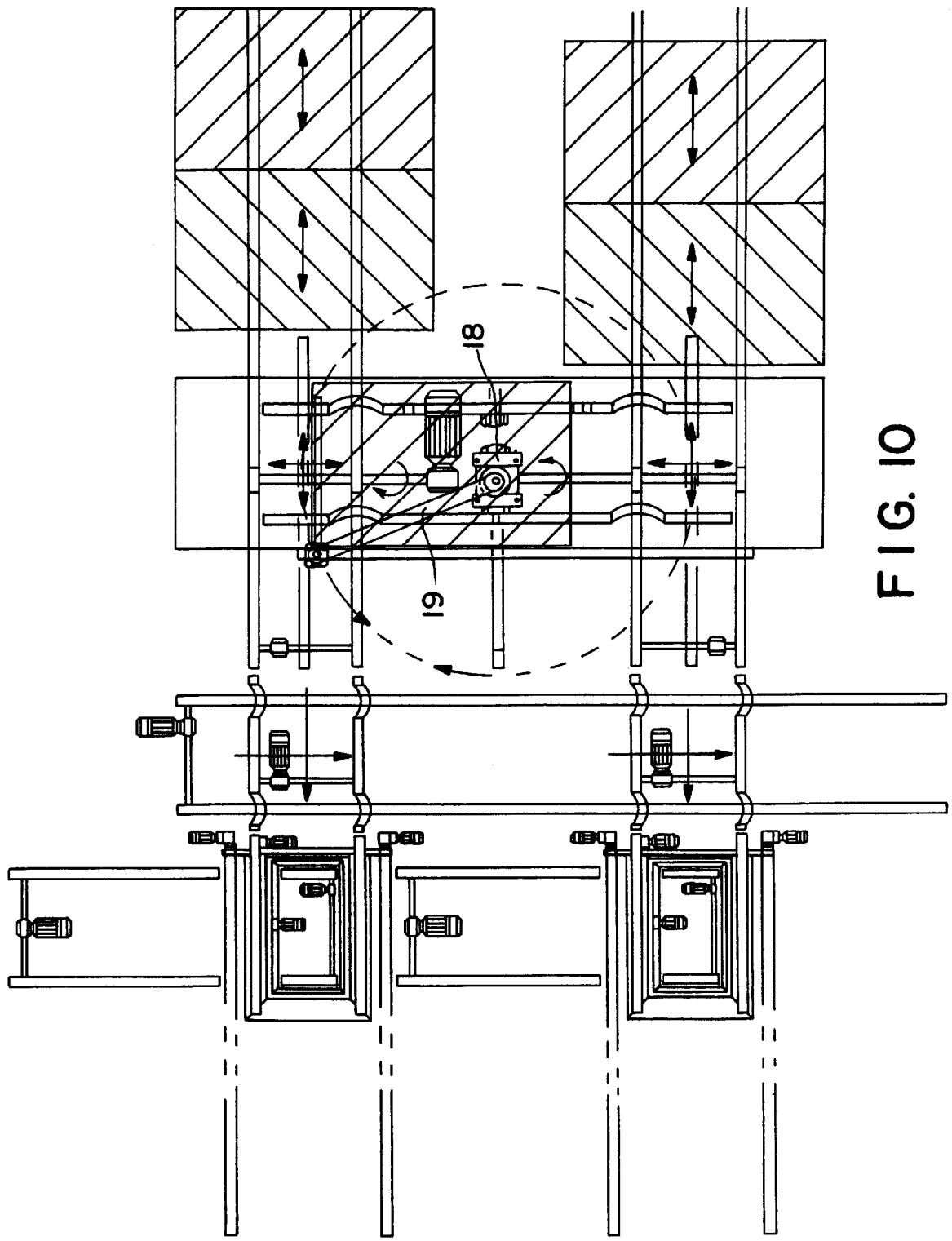

The drive version illustrated in FIG. 10 allows the number of drive motors to be reduced to one or two. This is achieved by driven angular gear 18, which is connected to main conveyor tracks 1, 2 via toothed belts in order to generate synchronous movement in opposite directions. Angular gear 18 is used, with a suitable step-down, to drive lever arm 19, whose rotary movement causes cross-conveyor track 6, 15 to move back and forth towards main conveyor tracks 1, 2, while also achieving crosswise transport at the same time. Two cam plates located below the angular gear permit track sections 7, 8 or 16, 17 to be raised and lowered as the shaft of the angular gear rotates.

I claim:

1. A storage and conveyor system for goods (3) comprising two horizontal main conveyor tracks (1, 2) running parallel to each other and being adapted to convey goods selectively in opposite main conveying directions, ends of said two horizontal main conveyor tracks (1, 2) lie substantially aligned with each other, a horizontal cross conveyor track (6) located at each of said main conveyor track ends, each said cross conveyor track (6) defining cross conveying directions substantially at right angles to said main conveying directions of the main conveyor tracks (1, 2), the cross conveyor tracks (6) each including at least two track sections (7, 8), located one behind the other in the cross conveying direction of the cross conveyor track (6), means for raising and lowering each said two track sections (7, 8) independently to thereby separately vertically raise and lower goods (3) for continuous transport of the goods (3) from one main conveyor track (1 or 2) to another main conveyor track (2 or 1), and means for moving each cross conveyor track (6) in the main conveying directions of the main conveyor tracks (1, 2) independently of the raising and lowering motion of the two track sections (7, 8).

2. The storage and conveyor system as defined in claim 1 wherein at least one of the main conveyor tracks (1, 2) and the cross conveyor tracks (6) are roller conveyors.

3. The storage and conveyor system as defined in claim 1 wherein the main conveyor tracks (1, 2) and the cross conveyor tracks (6) are roller conveyors.

4. The storage and conveyor system as defined in claim 1 including means (9, 10 and 11, 12) for driving the main conveyor tracks (1, 2) at a slower speed than the cross conveyor tracks (6).

5. The storage and conveyor system as defined in claim 1 including retrieval and storage mechanism (14) at each of said mail conveyor track ends.

6. The storage and conveyor system as defined in claim 1 including retrieval and storage mechanism (14) at each of said main conveyor track ends and said retrieval and storage mechanisms (14) include lifting devices.

7. The storage and conveyor system as defined in claim 1 including retrieval and storage mechanism (14) at each of said main conveyor track ends and said retrieval and storage mechanisms (14) include lifting devices in the form of straddle loaders.

8. The storage and conveyor system as defined in claim 1 including sensor means for detecting individual goods (3) to control the operation of the main conveyor tracks (1, 2), the cross conveyor tracks (6) and associated storage devices (14).

9. The storage and conveyor system as defined in claim 1 including sensor means for detecting individual goods (3) to control the operation of the main conveyor tracks (1, 2), the cross; conveyor tracks (6) and associated storage devices (14), and computer means responsive to the detection of said sensor means for controlling the operation of the main conveyor tracks (1, 2), the cross conveyor tracks (6) and the storage devices (14).

10. The storage and conveyor system as defined in claim 1 including a single drive motor (FIG. 10) for selectively driving said main conveyor tracks (1, 2) in opposite directions.

11. The storage and conveyor system as defined in claim 1 wherein said cross conveyor track moving means includes at least a single motor (FIG. 10).

12. The storage and conveyor system as defined in claim 1 wherein said cross conveyor track moving means includes at least a single motor (FIG. 10) and a lever arm (19).

13. The storage and conveyor system as defined in claim 1 wherein said cross conveyor track moving means includes at least a single motor (FIG. 10) and a lever arm (19) driven through an angular gear drive (18).

* * * * *